United States Patent [19]

Ezis et al.

[11] Patent Number: 4,510,107
[45] Date of Patent: Apr. 9, 1985

[54] METHOD OF MAKING DENSIFIED $Si_3N_4$/OXYNITRIDE COMPOSITE WITH PREMIXED SILICON AND OXYGEN CARRYING AGENTS

[75] Inventors: Andre Ezis, Grosse Ile; Howard D. Blair, Romulus, both of Mich.

[73] Assignee: Ford Motor Company, Dearborn, Mich.

[21] Appl. No.: 523,196

[22] PCT Filed: Jul. 19, 1983

[86] PCT No.: PCT/US83/01116

§ 371 Date: Jul. 19, 1983

§ 102(e) Date: Jul. 19, 1983

[51] Int. Cl.³ .............................................. C04B 35/58
[52] U.S. Cl. ..................................................... 264/65
[58] Field of Search .......................... 264/65, 66, 332; 501/97

[56] References Cited

U.S. PATENT DOCUMENTS 4,102,698  7/1978  Lange ..................................... 264/65
4,143,107  3/1979  Ishii ........................................ 264/65
4,341,874  7/1982  Nishida ................................. 501/97
4,350,771  9/1982  Smith .................................... 501/97
4,401,617  8/1983  Ezis ...................................... 264/332

OTHER PUBLICATIONS

Galasso, "Sintering of $Si_3N_4.ISY_2O_3$ Under High $N_2$ Pressure", *Ceramic Bulletin*, Aug. 1979, pp. 793–794.

*Primary Examiner*—John A. Parrish
*Attorney, Agent, or Firm*—Joseph W. Malleck; Olin B. Johnson

[57] ABSTRACT

A method is disclosed for making a more densified silicon nitride comprising object under less stringent heating conditions without sacrificing physical properties. A mixture of silicon powder, 6–18% yttrium silicon oxynitride (a major proportion of which is the $Y_{10}Si_6O_{24}N_2$ phase), 0.4–3% $Al_2O_3$, and possibly up to 2% of an oxynitride forming oxide ($Y_2O_3$) is compacted, nitrided, and sintered to produce a silicon nitride/YSi$O_2$N comprising object of relatively high density.

22 Claims, No Drawings

METHOD OF MAKING DENSIFIED SI₃N₄/OXYNITRIDE COMPOSITE WITH PREMIXED SILICON AND OXYGEN CARRYING AGENTS

TECHNICAL FIELD

The invention relates to the technology of making silicon nitride by reacting silicon powder under a nitrogenous atmosphere and then densifying the nitrided body by heat fusion.

BACKGROUND OF THE INVENTION AND PRIOR ART STATEMENT

In the art of making silicon nitride, it is conventional to add certain oxides to the raw material from which the fully dense silicon nitride body is constituted, such oxides act as pressing aids or sintering aids (see U.S. Pat. No. 4,143,107). The presence of these oxides has required higher temperatures, pressures, and pressing times to reach full densification, during hot pressing or sintering, than what is optimally desired for a more economical process.

Generally, compounds other than oxides have been introduced to silicon nitride as a result of chemical reaction during hot pressing or sintering (see U.S. Pat. Nos. 4,102,698; 4,341,874; and 4,350,771). Rarely have compounds other than oxides been introduced to Si₃N₄ prior to hot pressing or sintering. One indirect instance is disclosed in copending U.S. application Ser. No. 444,251, PCT application No. 82/01372, commonly assigned to the assignee of this invention. In this latter case, oxides were added to a silicon metal mixture and the mixture was nitrided to react the oxides and form a composite of silicon nitride, oxynitrides, and a small amount of silicate. Under this disclosure, the nitriding step was not able to optimally fulfill the dual roles imposed upon it, that is: (a) to efficiently convert all of the silicon to silicon nitride, and (b) at the same time form only a selected silicon oxynitride in a controlled optimum amount.

What is needed is the ability to introduce chemical modifications to the mixture prior to nitriding or heat treatment, which modifications allow for: (a) a more efficient conversion of silicon to silicon nitride, (b) a reduction in the time and temperature required in subsequent steps to hot press or sinter the mixture to a fully densified object, (c) freedom to decrease the amount of silicate forming oxide to a much lower controlled amount to optimize physical characteristics in the final object, and (d) closer control and proportioning of the desired secondary phase chemistry in the final product without total reliance on the vagaries of chemical reaction during any reaction heating involved in the process such as during nitriding, hot pressing, or sintering.

Continuing research, as exemplified herein, underscores the need for selectivity of silicon oxynitrides and the need for greater silicon conversion efficiency. Certain of these oxynitrides are more desirable than others and more desirable than silicates or oxides in promoting lower temperatures and pressures needed for processing. This selectivity is due in part to the fact that certain of these compounds have a higher degree of solubility for silicon nitride, thus tending to promote a reduction in at least one of the processing parameters (temperature, pressure, or hot pressing time) needed for full dissolution of the silicon nitride during the heat fusion step.

SUMMARY OF THE INVENTION

The invention is an improved method of making a more densified silicon nitride comprising object under less stringent heating conditions without sacrificing the physical properties now attainable by the most preferred prior art methods of making silicon nitride.

In a method where silicon powder is subjected to sequential heating, including first a nitriding heating to form silicon nitride and secondly a heating to fuse the resulting silicon nitride, the invention comprises having yttrium silicon oxynitride present with said silicon or silicon nitride prior to heating to fuse. A major proportion of the yttrium silicon oxynitride is of the $Y_{10}Si_6O_{24}N_2$ phase. The yttrium silicon oxynitride serves to dissolve the silicon nitride during the second heating to fuse, the dissolved yttrium silicon oxynitride converting to a more stable phase as a result of the second heating to fuse.

Preferably, the $Y_{10}Si_6O_{24}N_2$ phase is independently prepared and added to the low oxygen containing silicon powder prior to the first nitriding heating, the $Y_{10}Si_6O_{24}N_2$ phase remaining substantially unreacted during the nitriding heating. Alternatively, a yttrium silicon oxynitride of the $YSiO_2N$ phase and excess $SiO_2$ (generally present as a surface film on the silicon metal) may be proportioned to be present with the silicon powder prior to nitriding heating, the $YSiO_2N$ and excess $SiO_2$ reacting during nitriding heating to form the $Y_{10}Si_6O_{24}N_2$ phase prior to heating to fuse.

Preferably, the yttrium silicon oxynitride is added in an amount of 6–18% by weight of the resulting mixture and the $Y_{10}Si_6O_{24}N_2$ phase is generally proportioned to constitute at least 75% of the added oxynitride. The remaining oxynitride phase is preferably of the $Y_1SiO_2N$ phase, which converts substantially to $Y_{10}Si_6O_{24}N_2$ during nitriding (using available $SiO_2$ present as a film on the silicon metal). Preferably, the heating to fuse is carried out under atmospheric conditions and, advantageously, the $Y_{10}Si_6O_{24}N_2$ converts to the $YSiO_2N$ phase under such conditions after full consolidation has been reached.

The invention is also the making of a densified silicon nitride/oxynitride composite, by the steps of: (a) shaping a substantially homogeneous particulate mixture of (1) silicon powder carrying 0.4–3.5% by weight $SiO_2$ as a surface oxide, (ii) independently prepared yttrium silicon oxynitride in an amount of 6–18% by weight of the mixture and selected to effectively dissolve silicon nitride at a temperature of 1760° C., without the use of pressure, or less, (iii) a glass forming oxide effective to form a controlled small amount of glass silicate with other elements of the mixture on heating, and (iv) up to 2% by weight of $Y_2O_3$ effective to react with any excess silica during heating to form a silicon oxynitride, said shaping being carried out to form an object of less than required dimension and density; (b) heating the body in a nitriding atmosphere without the use of pressure to produce a silicon nitride/oxynitride comprising object; and (c) densifying the shaped body by heat fusion, with or without the use of pressure, to constitute an object of required density and dimension.

Preferably, the heat fusion is carried out at a temperature effective to form a solution of the silicon nitride, glass (such as an aluminum containing silicate), and yttrium silicon oxynitride, i.e., in the range of 1650°–1760° C. The yttrium silicon oxynitride, along with available aluminum containing silicates, serve to dissolve the silicon nitride during heating to fuse. Advantageously, the glass forming oxide is added in an amount of 0.4–3.0% by weight of the mixture and is selected from the group consisting of $Al_2O_3$, MgO, $CeO_2$, $ZrO_2$, $HfO_2$, $B_2O_3$, and $BeO_2$. Advantageously, the oxynitride forming oxide is selected from the group consisting of $Y_2O_3$ and rare earth oxides.

The product resulting from the practice of the method herein is inventively characterized by a silicon nitride/oxynitride composite, wherein the oxynitride consists substantially of the $YSiO_2N$ phase in the crystalline form, and a glass silicate thinly coats the crystallites of silicon nitride and $YSiO_2N$. The silicate coating is preferably in a thickness of 2–10 angstroms and has little or no microporosity.

It is preferable that nitriding heating be carried out in a gaseous atmosphere containing essentially nitrogen and helium and a small proportion of hydrogen, the pressure of the atmosphere being maintained at about 2.7 psig. The nitriding is preferably carried out at an ultimate temperature of about 2000°–2600° F. (1093°–1427° C.) for a period of about 72–160 hours.

The densifying step may be preferably carried out by either the use of hot pressing to an ultimate temperature level of about 3000°–3200° F. under a pressure of about 2500–4000 psi for a period of about 0.25–3 hours, or sintering whereby the body is heated to a temperature of 3000°–3200° F. (1650°–1760° C.) for a period of 0.5–12 hours without the use of pressure.

BEST MODE FOR CARRYING OUT THE INVENTION

A preferred mode for carrying out the present invention is as follows.

1. Mixture Forming

A homogeneous powder mixture of (i) silicon powder (carrying 0.4–3.5% $SiO_2$ by weight of the silicon as a surface oxide, (ii) independently prepared yttrium silicon oxynitride in an amount of 6–18% by weight of the mixture, (iii) 0.4–3% by weight of the mixture of a glass forming oxide effective to form a controlled small amount of glass silicate with other elements of the mixture upon heating, and (iv) up to 2% by weight of the mixture of $Y_2O_3$ effective to react with silica during nitriding heating to form a silicon oxynitride.

The silicon powder is selected to have a purity of 98% or greater and a starting average particle size of 2.5–3.0 microns with no particles or hard agglomerates exceeding 10 microns in size. The major trace metal contaminants experienced with such impurity include, as a maximum: Fe—1.0%, Ca—0.02%, Al—0.5%, and Mn—0.09%. Nonmetallic contaminants include, as a maximum: carbon—0.05%, and $O_2$—less than 0.5%. Silicon is selected so that after blending and comminution the oxygen content is less than 1.75%. Comminution increases oxygen content, therefore, the starting silicon contains oxygen levels substantially lower than 1.75%.

The yttrium silicon oxynitride is optimally the $Y_{10}Si_6O_{24}N_2$ phase and secondarily the $YSiO_2N$ phase which can be converted to the $Y_{10}Si_6O_{24}N_2$ phase prior to heating to fuse, preferably independently prepared in accordance with the teaching of copending U.S. application Ser. No. (80-207), commonly assigned to the assignee of this invention, and the disclosure of which is incorporated herein by reference. The range of addition (6–18% of the mixture) is based on the following considerations: if more than about 18% of the oxynitride is employed, the secondary phases in the final product will undesirably begin to dominate the physical properties thereof; if less than about 6% of the oxynitride is employed, considerable difficulty will be encountered in achieving full density in the resulting product.

Instead of optimally adding the yttrium silicon oxynitride in the form of an independently prepared phase where at least 75% is of the type $Y_{10}Si_6O_{24}N_2$, the $YSiO_2N$ phase may be used as a substitute to facilitate use of higher levels of oxygen in the silicon metal. Thus, during nitriding heating, the $YSiO_2N$ and excess $SiO_2$ will react to form $Y_{10}Si_6O_{24}N_2$. $Y_{10}Si_6O_{24}N_2$ must constitute a major portion of the second phase content, at least prior to heating to fuse, because this phase permits (a) dissolution of $Si_3N_4$ at a lower temperature and/or accompanying pressure and thus reduces the time and energy requirements for achieving full densification, and (b) closer control and proportioning of the desired secondary phase chemistry in the final product. Use of independently prepared oxynitrides permits (a) more efficient conversion of silicon to silicon nitride during nitriding heating, and (b) freedom to decrease the amount of glass forming oxide to a much lower controlled amount to optimize physical characteristics in the final product.

The glass forming oxide is preferably selected to be $Al_2O_3$ having a purity of at least 99.5% with an average particle size of 2–3 microns or less and no particles greater than 10 microns and with a crystal size of less than 0.5 microns. Other glass forming oxides that can also be used include MgO, $CeO_2$, $ZrO_2$, $HfO_2$, $B_2O_3$, and $BeO_2$. The glass forming oxide reacts with excess $SiO_2$ during heating to form a small, but controlled, amount of protective amorphous silicate coating the oxynitride crystallites. This glass coating is usually in the thickness range of 2–10 angstroms and has little or no microporosity. The glass is useful to prevent high temperature oxidation of the crystalline phase in the final product, particularly when the product is used as a cutting tool. More than 2% glass is to be generally avoided since such glass would have a deleterious effect on strength at elevated temperatures and decrease its utility as a cutting tool.

The oxide, added to form an oxynitride with any excess silica, is preferably $Y_2O_3$ having a purity of at least 99.99% and a surface area greater than 6.3 m²/gm and a crystal size of less than 0.5 microns. The mixture is blended by being charged into an inert milling jar along with grinding media in the form of $Si_3N_4$ based cylinders, the $Si_3N_4$ cylinders being of the same composition as the mixture. The mixture is blended and/or milled for 48 hours at 64 rpm and then separated from the milling media by the use of a #10 mesh screen. The blending and/or milling is preferably carried out dry, but can be wet, with some accompanying disadvantages.

2. Shaping

The milled or comminuted mixture is then shaped to form a body of a general dimension and configuration desired. It is preferable for simple shapes that shaping be carried out by loading the milled mixture into a cold pressing die arrangement and pressed at 1400–1500 psi to form the desired shaped compact with an accompanying density of about 1.4 gm/cm³ or greater. However, the shaping step can be carried out successfully by other modes such as extrusion, heating agglomeration in a die, hydrostatic pressing, or by the preferred cold compaction above. Slip casting is somewhat difficult because of the number of elements involved in the mixture system therefore requiring unusually sensitive control.

3. Heating to Nitride

The compact is heated in a nitriding atmosphere, without the use of pressure, to produce essentially a silicon nitride comprising body containing 5–17% yttrium silicon oxynitride. When the silicon metal has a low silica content (i.e., less than 1.7% after milling), the $Y_{10}Si_6O_{24}N_2$ phase is added directly, such phase will remain unreacted during the nitriding treatment. When the silicon metal contains a high oxygen content, it is preferable to substitute $YSiO_2N$ for the $Y_{10}Si_6O_{24}N_2$ phase; the latter phase will then be produced as a result of the presence of sufficient $SiO_2$ and the nitriding heating. The nitrided body may contain up to 0.5% free silicon and unreacted oxygen carrying agents. The body will have a size greater than and a density less than the object to be formed.

To carry out the heating, the compact is preferably placed in an enclosed furnace, evacuated to a pressure of less than one micron, and heated at a fast rate, i.e., 500° C./hr (932° F./hr) to 649° C. (1200° F.). The furnace is then filled with a gaseous mixture consisting of 72% by weight nitrogen, 25% by weight helium, and 3% by weight hydrogen, at a pressure of about 2.7 psig. The total $O_2$ and $H_2O$ content in such a gaseous mixture is less than 4 ppm. The temperature of the furnace is then increased in steps to 1200°–1700° F. (649°–927° C.) at 500° F./hr (278° C.) to 1700°–2000° F. (927°–1093° C.) at 200° F./hr (111° C.), and through nitriding temperatures of 2000°–2600° F. (1093°–1427° C.) at a much slower rate. Fresh (99.999% pure) nitrogen is intermittently supplied to the furnace to replace the nitrogen consumed in forming silicon nitride and possibly additional oxynitrides. Nitrogen is added when the pressure drops below 2.4 psig and brought back up to a maximum pressure of 2.7 psig. Once complete nitridation is achieved, the material is then cooled to room temperature at a rate of 250° F./hr (139° C./hr).

The nitrided body will preferably consist of silicon nitride (at least 60% of which is in the alpha form), 5–17% yttrium silicon oxynitride in the $Y_{10}Si_6O_{24}N_2$ phase with possible minor amounts of $YSiO_2N$ crystalline phase, and the remainder aluminosilicate glass possibly containing $Y_2O_3$, and up to 0.5% of silicon and unreacted $Y_2O_3$ or $Al_2O_3$. The N-melilite phase ($Y_2O_3 \cdot Si_3N_4$) will be present in an amount no greater than 0.5% by weight of the body. The body will have a density of at least 1.9 gm/cm$^3$. The minimum alpha/beta $Si_3N_4$ ratio is approximately 2:1.

4. Heating to Fuse

Full densification is preferably carried out by sintering for a period sufficient to densify the shaped body to a product of required dimension and density. Sintering heating is carried out at a temperature level effective to sinter, but without sublimation of the silicon nitride (temperatures and times are selected according to body composition and size); such temperature is preferably in the range of 3000°–3200° F. (1650°–1760° C.) and advantageously about 1725° C. for eight hours (for a median composition of 4–6 cubic inches). The heating can be carried out in an inert atmosphere with or without the use of mechanical or atmospheric over-pressure, or with or without the use of a blanket of ceramic packing medium such as loose silicon nitride powder. For the preferred mode, the heat-up to the sintering temperature is staged first at a rate of about 600° C./hr (1080° F./hr) to a temperature level of about 600° C. (1112° F.) under a vacuum (less than 20 microns), held for one hour, and then heated at a rate of about 600° C./hr (1080° F./hr) to the sintering temperature of 1725° C. (3137° F.), and held at this temperature for a time sufficient (such as 2–12 hours) to permit achieving full theoretical density. Nitrogen gas, with up to 5% helium, is introduced to the furnace during heating to sintering (the last heat-up rate of 600° C./hr). The gas may also have controlled amounts of $O_2$.

Alternatively, a simple shaped nitrided body can be hot pressed to produce the silicon nitride comprising object of required dimension and density. A pressing fixture having graphite walls is used to carry out hot pressing. The walls and shaped body are both coated with a slurry of boron nitride and dried. The pressing fixture, with the shaped body therein, is placed in the hot pressing furnace. The heating and pressing is carried out preferably in increments: (1) a mechanical loading of 100 psi is applied at room temperature to the body; (2) the temperature is increased to 1800° F. (982° C.) and pressure increased to 500 psi; (3) the temperature is then increased to 2500° F. (1371° C.) and the pressure is simultaneously increased to 2500 psi; (4) the temperature is finally increased to the ultimate hot pressing temperature of 3200° F. (1760° C.) and pressure increased to 3700–4000 psi, the latter conditions being maintained until at least 99% or desirably 99.5% of full theoretical density is achieved. This usually requires 0.25–3.0 hours at the ultimate hot pressing temperature, optimally about 60 minutes. The object is then cooled at any rate, even quenched, to room temperature.

5. Resulting Product

The resulting object will consist essentially of beta silicon nitride, 5–71% by weight yttrium silicon oxynitride crystallites, predominantly of the $YSiO_2N$ phase, and enveloped by up to 2% of a protective glass silicate in the thickness range of 2–10 angstroms and having little or no microporosity. The object preferably possesses a hardness of 88.0–92.0 on the 45-N scale for isotropic materials (but as low as 87.0 for materials not isotropic), a density of 3.2–3.45 gm/cm$^3$, an average fracture strength above 85,000 psi at 1200° C. in a 4-point bend test, and an oxidation resistance that provides little or no increase in weight by the object after 450 hours in air at 1000° C. Some oxynitrides of the $Y_{10}Si_6O_{24}N_2$ and $Y_4Si_2ON_2$ phases can be present up to 10% of the second phase content.

EXAMPLES

A series of six samples were prepared by the nitriding and sintering sequence and were tested as to density to illustrate how variations in the chemistry facilitate or deny obtaining the advantages of this invention. The variations and results are summarized in Table 1.

In sample 1, a mixture was prepared with silicon powder containing therein 1% or less by weight $SiO_2$, 10.3% $Y_{10}Si_6O_{24}N_2$ (H phase), and 1.5% glass forming oxide ($Al_2O_3$), The sample 1 mixture was compacted, nitrided, and sintered in accordance with the conditions of the preferred mode. The measured density of the compact prior to nitriding was 1.48 gm/cm$^3$; it increased to 2.29 gm/cm$^3$ after nitriding, and rose to 3.31 gm/cm$^3$ after sintering. The presence of the Y$_{10}$Si$_6$O$_{24}$N$_2$ phase facilitated sintering at 1725° C. for eight hours, and allowed for control of the amount of YSiO$_2$N phase in the secondary phase of the final product without degrading the high density of the final prouct. Increasing the Al$_2$O$_3$ content, as shown in sample 3, decreased the sintering time for achieving full density to four hours. Final oxynitride phase content did not change significantly from that in Sample 1.

When the YSiO$_2$N phase is added to the mixture (in place of the Y$_{10}$Si$_6$O$_{24}$N$_2$ phase), without sufficient SiO$_2$ to react with such phase, the final density in the product is lowered, even though all other conditions remain the same (see sample 2). Sample 6 demonstrates how adding the Y$_1$SiO$_2$N phase with sufficient but extra amounts of SiO$_2$ to react with the YSiO$_2$N phase produces an enhanced density.

Sample 4 illustrates how up to 25% of the added oxynitride can be the YSiO$_2$N phase, with the remainder Y$_{10}$Si$_6$O$_{24}$N$_2$, while achieving relatively satisfactory density with equivalent processing conditions.

Lastly, sample 5 illustrates how noncompliance with the requirement for adding, or having present before sintering, a major quantity of the Y$_{10}$Si$_6$O$_{24}$N$_2$ phase results in poor final density and the presence of unwanted secondary phases in the final product (such as the N-melilite phase).

TABLE 1

| | Silicon Powder Mixture Before Milling | | | | | After Nitriding Heating | | | | After Heating to Fuse | | | |
|---|---|---|---|---|---|---|---|---|---|---|---|---|---|
| | Additive (% by wt.) | | | | | % Secondary Phase | | | | % Secondary Phase | | | |
| Sample | H | K | Y$_2$O$_3$ | Al$_2$O$_3$ | *SiO$_2$ | Den. g/cm$^3$ | H | K | Y$_2$Si$_3$N$_4$ | Den. g/cm$^3$ | H | K | Y$_2$Si$_3$N$_4$ | Den. g/cm$^3$ |
| 1 | 10.3 | 0 | 0 | 1.5 | <1.0 | 1.48 | 100 | Nil | Nil | 2.29 | 11 | 89 | Nil | 3.31 |
| 2 | 0 | 11.5 | 0 | 1.5 | <1.0 | 1.50 | 18 | 82 | Nil | 2.32 | Nil | 90 | 10 | 2.95 |
| 3 | 10.3 | 0 | 0 | 2.2 | <1.0 | 1.51 | 100 | Nil | Nil | 2.33 | 8 | 92 | Nil | 3.32 |
| 4 | 7.8 | 2.8 | 0 | 1.5 | 1.95 | 1.48 | 93 | 7 | Nil | 2.29 | Nil | 100 | Nil | 3.30 |
| 5 | 0 | 0 | 12.8 | 1.5 | <1.0 | 1.50 | Nil | 5 | 95 | 2.32 | Nil | Nil | 100 | 2.28 |
| 6 | 0 | 11.5 | 0 | 1.5 | 3.0 | 1.51 | 86 | 14 | Nil | 2.32 | Nil | 100 | Nil | 3.31 |

*Not added to mix, contained on silicon metal surface.

We claim:

1. In a method of making a densified silicon nitride comprising object, wherein silicon powder is subjected to sequential heating including first a nitriding heating to form silicon nitride and second a heating to fuse the resulting silicon nitride, the improvement comprising having yttrium silicon oxynitride present with said silicon or silicon nitride prior to said heating to fuse, a major proportion of the yttrium silicon oxynitride is of the Y$_{10}$Si$_6$O$_{24}$N$_2$ phase, said yttrium silicon oxynitride serving to dissolve said silicon nitride during said second heating to fuse and to convert to a more stable phase as a result of the second heating to fuse.

2. In the method of making of claim 1, wherein said Y$_{10}$Si$_6$O$_{24}$N$_2$ phase converts to the Y$_1$SiO$_2$N phase under the conditions of heating to fuse.

3. In the method of making of claim 1, wherein yttrium silicon oxynitride of the Y$_{10}$Si$_6$O$_{24}$N$_2$ phase is independently prepared and added to said silicon powder prior to said first nitriding heating, said Y$_{10}$Si$_6$O$_{24}$N$_2$ phase remaining substantially unreacted during said nitriding heating.

4. In the method of making of claim 1, wherein yttrium silicon oxynitride of the Y$_1$SiO$_2$N phase and excess SiO$_2$ are present with said silicon powder prior to said nitriding heating, said Y$_1$SiO$_2$N and excess SiO$_2$ reacting during nitriding heating to form the Y$_{10}$Si$_6$O$_{24}$N$_2$ phase prior to heating to fuse.

5. In the method of making of claim 4, wherein said excess SiO$_2$ is proportioned to be present in an amount needed to form Y$_{10}$Si$_6$O$_{24}$N$_2$ from Y$_1$SiO$_2$N.

6. In the method of making of claim 3, wherein the yttrium silicon oxynitride is added to said silicon powder in an amount of 6–18% by weight of the resulting mixture and said Y$_{10}$Si$_6$O$_{24}$N$_2$ phase constitutes at least 75% of the yttrium silicon oxynitride prior to heating to fuse.

7. In the method of making of claim 1, wherein said heating to fuse is carried out under inert atmospheric conditions.

8. A method of making a densified silicon nitride/oxynitride composite, by the steps of:
(a) shaping a substantially homogeneous particulate mixture of (i) silicon powder carrying 0.4–3.5% by weight SiO$_2$ of the silicon powder as a surface oxide, (ii) independently prepared yttrium silicon oxynitride in an amount of 6–18% by weight of the mixture and selected to be effective to dissolve silicon nitride at a temperature of 1760° C. or lower, (iii) a glass forming oxide effective to form a controlled small amount of glass silicate with other elements of said mixture upon heating, and (iv) up to 2% by weight of the mixture of Y$_2$O$_3$ effective to react with any excess silica during heating to form a silicon oxynitride, said shaping being carried out to form an object of less than required dimension and density;
(b) heating said body in a nitriding atmosphere without the use of pressure to produce a silicon nitride/oxynitride comprising object; and
(c) densifying said shaped body at heat fusion, with or without the use of pressure, to constitute an object of required density and dimension.

9. The method as in claim 8, in which said heat fusion of step (c) is carried out under inert atmospheric conditions.

10. The method as in claim 8, in which said added yttrium oxynitride is constituted at least 75% of the Y$_{10}$Si$_6$O$_{24}$N$_2$ phase.

11. The method as in claim 10, in which said Y$_{10}$Si$_6$O$_{24}$N$_2$ phase is converted substantially to the Y$_1$SiO$_2$N phase during heat fusion.

12. The method as in claim 8, in which said heat fusion is carried out at a temperature effective to form a solution of said silicon nitride and yttrium silicon oxynitride.

13. The method as in claim 12, in which said temperature is in the range of 1650°–1760° C. (3000°–3200° F.).

14. The method as in claim 8, in which said glass forming oxide is added in an amount of 0.4–3.0% by weight of the mixture and is selected from the group consisting of $Al_2O_3$, $MgO$, $CeO_2$, $ZrO_2$, $HfO_2$, $B_2O_3$, and $BeO_2$.

15. The method as in claim 8, in which said oxynitride forming oxide is selected from the group consisting of $Y_2O_3$ and rare earth oxides.

16. The product resulting from the practice of claim 8, comprising a silicon nitride/oxynitride composite, wherein the oxynitride substantially consists of the $YSiO_2N$ phase in the crystalline form and a glass silicate thinly coats the crystallites of silicon nitride and yttrium silicon oxynitride.

17. The product as in claim 16, in which said silicate coating is in the thickness range of 2–10 angstroms and has little or no microporosity.

18. The method as in claim 8, in which nitriding heating is carried out in a nitrogen atmosphere at a pressure of about 2.7 psig and containing up to 25% by weight helium.

19. The method as in claim 18, in which said nitriding heating is carried out for a period of 72–160 hours at a temperature of 2000°–2600° F. (1093°–1427° C.).

20. The method as in claim 13, in which said densifying step is carried out by use of hot pressing at said temperature range under a pressure of about 2500–4000 psi for about 0.25–3 hours.

21. The method as in claim 13, in which said densifying step is carried out by sintering at said temperature range for a period of about 0.5–12 hours.

22. The method as in claim 3, in which said silicon powder has a low oxygen content, less than 0.5% of the silicon metal.

* * * * *